US012677139B2

(12) United States Patent
Hong

(10) Patent No.: US 12,677,139 B2
(45) Date of Patent: Jul. 7, 2026

(54) METHOD AND APPARATUS FOR REDUCING INTERFERENCE, COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 314 days.

(21) Appl. No.: 18/552,041

(22) PCT Filed: Mar. 25, 2021

(86) PCT No.: PCT/CN2021/083082

§ 371 (c)(1),
(2) Date: Sep. 22, 2023

(87) PCT Pub. No.: WO2022/198589

PCT Pub. Date: Sep. 29, 2022

(65) Prior Publication Data

US 2024/0187844 A1 Jun. 6, 2024

(51) Int. Cl.
*H04W 8/24* (2009.01)
*H04W 72/0453* (2023.01)

(52) U.S. Cl.
CPC ......... *H04W 8/24* (2013.01); *H04W 72/0453* (2013.01)

(58) Field of Classification Search
CPC ........ H04W 8/24; H04W 72/0453; H04L 5/00
See application file for complete search history.

(56) References Cited

U.S. PATENT DOCUMENTS 10,128,877 B2 * 11/2018 Jin ........................ H04W 24/10
11,272,511 B2 * 3/2022 Soriaga .............. H04L 41/0806
2017/0222671 A1 8/2017 Jin et al.
(Continued)

FOREIGN PATENT DOCUMENTS

CN 105450565 A 3/2016
CN 109842943 A 6/2019
CN 110011772 A 7/2019
(Continued)

OTHER PUBLICATIONS

Qualcomm Incorporated, "MRTD/MTTD requirements in FR2 inter-band CA", Aug. 28, 2020, Whatthespec, https://whatthespec.net/3gpp/tdoc.php?q=&meeting=R4-96-e (Year: 2020).*
(Continued)

*Primary Examiner* — Akwasi M Sarpong
*Assistant Examiner* — Gabrielle N Dai
(74) *Attorney, Agent, or Firm* — Volpe Koenig

(57) ABSTRACT

Provided in embodiments of the present disclosure are a method and apparatus for reducing interference, a communication device, and a storage medium. The method according to the embodiments of the present disclosure is performed by a terminal device, and includes: reporting processing capacity indication information of the terminal device, where the processing capacity indication information is configured to indicate a processing capacity of the terminal device in a carrier aggregation scenario.

18 Claims, 6 Drawing Sheets

(56) References Cited

U.S. PATENT DOCUMENTS

2020/0322944 A1    10/2020   Soriaga et al.

FOREIGN PATENT DOCUMENTS

| CN | 110049556 A | 7/2019 |
| CN | 112272386 A | 1/2021 |

OTHER PUBLICATIONS

ISA State Intellectual Property Office of the People's Republic of China, International Search Report Issued in Application No. PCT/CN2021/083082, Nov. 25, 2021, WIPO, 6 pages.
Ericsson etc. "Further study feasibility to support up to 3 µs MRTD""3GPP TSG-RAN WG4 Meeting #96-e R4-2010616 Electronic Meeting, Aug. 17-Aug. 28, 2020" Aug. 28, 2020, 4 pages.
Qualcomm Incorporated "MRTD/MTTD requirements in FR2 interband CA""3GPP TSG-RAN WG4 #96-e R4-2009984 Online, Aug. 17-Aug. 28, 2020", Aug. 28, 2020, 5 pages.

* cited by examiner

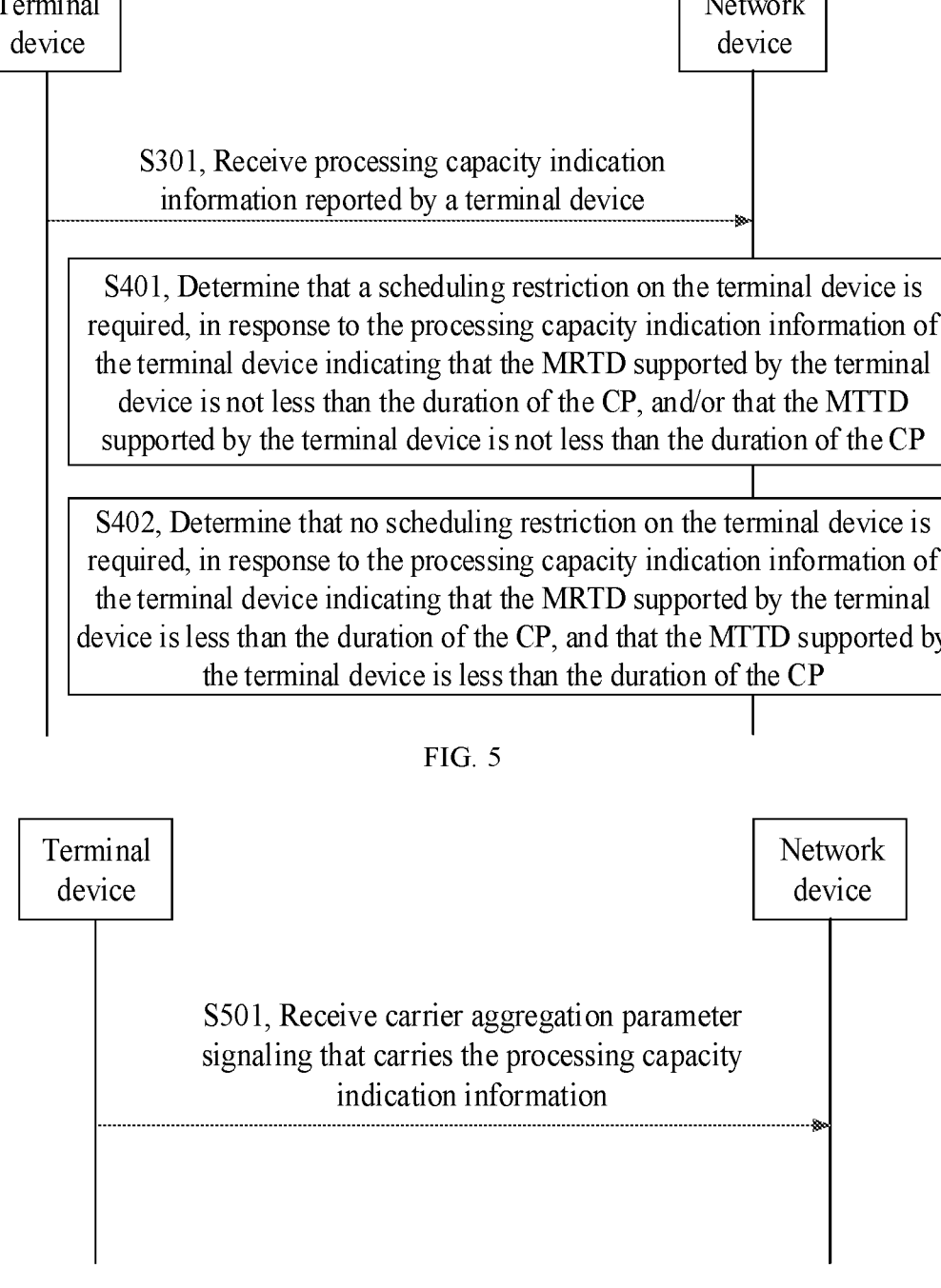

Terminal device

Network device

S301, Receive processing capacity indication information reported by a terminal device S401, Determine that a scheduling restriction on the terminal device is required, in response to the processing capacity indication information of the terminal device indicating that the MRTD supported by the terminal device is not less than the duration of the CP, and/or that the MTTD supported by the terminal device is not less than the duration of the CP S402, Determine that no scheduling restriction on the terminal device is required, in response to the processing capacity indication information of the terminal device indicating that the MRTD supported by the terminal device is less than the duration of the CP, and that the MTTD supported by the terminal device is less than the duration of the CP

FIG. 5

Terminal device

Network device

S501, Receive carrier aggregation parameter signaling that carries the processing capacity indication information

FIG. 6

Apparatus 700

Reporting module 701

FIG. 7

Apparatus 800

Receiving module 801

FIG. 8

METHOD AND APPARATUS FOR REDUCING INTERFERENCE, COMMUNICATION DEVICE AND STORAGE MEDIUM

CROSS-REFERENCE TO RELATED APPLICATIONS

This disclosure is the U.S. national phase of PCT Application No. PCT/CN2021/083082 filed on Mar. 25, 2021, the disclosure of which is incorporated herein by reference in its entirety.

TECHNICAL FIELD

Embodiments of the present disclosure relate to, but are not limited to, the field of wireless communications, and in particular relate to a method and apparatus for reducing interference, a communication device, and a storage medium.

BACKGROUND

In the related art, FR2 inter-band CA (Frequency Range 2 inter-band Carrier Aggregation) scenarios have been introduced in a 5G NR (New Radio) system. UE (User Equipment) may receive downlink signals from different serving cells by means of IBM (Independent Beam Management) or CBM (Common Beam Management). For UE that supports IBM, independently received or transmitted beams may be used for data reception and transmission in different serving cells, respectively. However, for a UE that only supports CBM, inter-symbol interference may occur when network devices schedule data services.

SUMMARY

The present disclosure provides a method and apparatus for reducing interference, a communication device, and a storage medium.

According to a first aspect of embodiments of the present disclosure, there is provided a method of reducing interference, performed by a terminal device, the method including: reporting processing capacity indication information of the terminal device, where the processing capacity indication information is configured to indicate a processing capacity of the terminal device in a carrier aggregation scenario.

In some embodiments, the processing capacity indication information includes at least one of a Maximum Received Timing Difference MRTD or a Maximum Transmit Timing Difference MTTD supported by the terminal device.

In some embodiments, the processing capacity indication information includes at least one of: first indication information indicating whether the MRTD supported by the terminal device is less than a duration of a Cyclic Prefix CP; or second indication information indicating whether the MTTD supported by the terminal device is less than the duration of the CP.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In some embodiments, the processing capacity indication information indicates that the MRTD supported by the terminal device is not less than the duration of the CP, and/or indicates that the MTTD supported by the terminal device is not less than the duration of the CP, then a scheduling restriction on the terminal device by a network device is required; the processing capacity indication information indicates that the MRTD supported by the terminal device is less than the duration of the CP, and that the MTTD supported by the terminal device is less than the duration of the CP, then no scheduling restriction on the terminal device by the network device is required.

In some embodiments, reporting the processing capacity indication information of the terminal device, includes: reporting carrier aggregation parameter signaling that carries the processing capacity indication information.

According to a second aspect of embodiments of the present disclosure, there is provided a method of reducing interference, performed by a network device, the method including: receiving processing capacity indication information reported by a terminal device, where the processing capacity indication information is configured to indicate a processing capacity of the terminal device in a carrier aggregation scenario.

In some embodiments, the processing capacity indication information includes at least one of a Maximum Received Timing Difference MRTD or a Maximum Transmit Timing Difference MTTD supported by the terminal device.

In some embodiments, the processing capacity indication information includes at least one of: first indication information indicating whether the MRTD supported by the terminal device is less than a duration of a Cyclic Prefix CP; or second indication information indicating whether the MTTD supported by the terminal device is less than the duration of the CP.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In some embodiments, the method further includes: in response to the processing capacity indication information of the terminal device indicating that the MRTD supported by the terminal device is not less than the duration of the CP, and/or that the MTTD supported by the terminal device is not less than the duration of the CP, determining that a scheduling restriction on the terminal device is required; or in response to the processing capacity indication information of the terminal device indicating that the MRTD supported by the terminal device is less than the duration of the CP, and that the MTTD supported by the terminal device is less than the duration of the CP, determining that no scheduling restriction on the terminal device is required.

In some embodiments, receiving the processing capacity indication information reported by the terminal device, includes: receiving carrier aggregation parameter signaling that carries the processing capacity indication information.

According to a third aspect of embodiments of the present disclosure, there is provided an apparatus for reducing interference, applied to a terminal device, the apparatus including: a reporting module configured to report processing capacity indication information of the terminal device, where the processing capacity indication information is configured to indicate a processing capacity of the terminal device in a carrier aggregation scenario.

In some embodiments, the processing capacity indication information includes at least one of a Maximum Received Timing Difference MRTD or a Maximum Transmit Timing Difference MTTD supported by the terminal device.

In some embodiments, the processing capacity indication information includes at least one of: first indication information indicating whether the MRTD supported by the terminal device is less than a duration of a Cyclic Prefix CP; or second indication information indicating whether the MTTD supported by the terminal device is less than the duration of the CP.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In some embodiments, the processing capacity indication information indicates that the MRTD supported by the terminal device is not less than the duration of the CP, and/or indicates that the MTTD supported by the terminal device is not less than the duration of the CP, then a scheduling restriction on the terminal device by a network device is required; the processing capacity indication information indicates that the MRTD supported by the terminal device is less than the duration of the CP, and that the MTTD supported by the terminal device is less than the duration of the CP, then no scheduling restriction on the terminal device by the network device is required.

In some embodiments, the reporting module includes: a reporting sub-module configured to report carrier aggregation parameter signaling that carries the processing capacity indication information.

According to a fourth aspect of embodiments of the present disclosure, there is provided an apparatus for reducing interference, applied to a network device, the apparatus including: a receiving module configured to receive processing capacity indication information reported by a terminal device, where the processing capacity indication information is configured to indicate a processing capacity of the terminal device in a carrier aggregation scenario.

In some embodiments, the processing capacity indication information includes at least one of a Maximum Received Timing Difference MRTD or a Maximum Transmit Timing Difference MTTD supported by the terminal device.

In some embodiments, the processing capacity indication information includes at least one of: first indication information indicating whether the MRTD supported by the terminal device is less than a duration of a Cyclic Prefix CP; or second indication information indicating whether the MTTD supported by the terminal device is less than the duration of the CP.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In some embodiments, the apparatus further includes: a first determining module configured to, in response to the processing capacity indication information of the terminal device indicating that the MRTD supported by the terminal device is not less than the duration of the CP, and/or that the MTTD supported by the terminal device is not less than the duration of the CP, determine that a scheduling restriction on the terminal device is required; or a second determining module configured to, in response to the processing capacity indication information of the terminal device indicating that the MRTD supported by the terminal device is less than the duration of the CP, and that the MTTD supported by the terminal device is less than the duration of the CP, determine that no scheduling restriction on the terminal device is required.

In some embodiments, the receiving module includes: a receiving sub-module configured to receive carrier aggregation parameter signaling that carries the processing capacity indication information.

According to a fifth aspect of embodiments of the present disclosure, there is provided a communication device, including at least a processor and an interface circuit, where the interface circuit is configured to receive code instructions and transmit the code instructions to the processor; and the processor is configured to run the code instructions to perform steps in the method according to any one of the above embodiments.

According to a sixth aspect of embodiments of the present disclosure, there is provided a non-transitory computer-readable storage medium for storing computer-executable instructions, where the computer-executable instructions, when executed, are configured to perform steps in the method according to any one of the above embodiments.

Embodiments of the present disclosure provide a method of reducing interference, in which a terminal device instructs a network device to determine whether a scheduling restriction on the terminal device is required when scheduling the terminal device, by reporting its own processing capacity indication information. In this way, varying degrees of inter-symbol interference due to different processing capacities of terminal devices during data scheduling by the network device can be reduced, and the stability of data transmission by the terminal device can be improved.

BRIEF DESCRIPTION OF DRAWINGS

The accompanying drawings, which are incorporated into and constitute a part of this specification, illustrate embodiments consistent with the present disclosure and, together with the specification, serve to explain the principles of embodiments of the present disclosure.

FIG. 5 is a schematic flowchart illustrating a method of reducing interference according to a fourth exemplary embodiment.

FIG. 6 is a schematic flowchart illustrating a method of reducing interference according to a fifth exemplary embodiment.

FIG. 7 is a block diagram illustrating a structure of an apparatus for reducing interference according to a first exemplary embodiment.

FIG. 8 is a block diagram illustrating a structure of an apparatus for reducing interference according to a second exemplary embodiment.

DETAILED DESCRIPTION

Reference will now be made in detail to exemplary embodiments, examples of which are illustrated in the accompanying drawings. When the following description refers to the drawings, the same numerals in different drawings indicate the same or similar elements, unless otherwise indicated. Embodiments described in the following exemplary embodiments are not intended to be representative of all embodiments consistent with the present disclosure. Rather, they are merely examples of apparatuses and methods consistent with some aspects of embodiments of the present disclosure as detailed in the appended claims.

The terminology used in embodiments of the present disclosure is for the purpose of describing particular embodiments only, and is not intended to limit embodiments of the present disclosure. As used in embodiments of the present disclosure and the appended claims, singular forms of "a," "an," "said," and "the" are intended to include plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the embodiments of the present disclosure to describe various information, such information should not be limited by these terms. These terms are used only to distinguish one type of information from another. For example, the first information may also be referred to as the second information, and similarly, the second information may also be referred to as the first information, without departing from the scope of the embodiments of the present disclosure. Depending on the context, the word "if" as used herein may be interpreted as "when," "upon" or "in response to determining".

To describe any one of the embodiments of the present disclosure, an embodiment of the present disclosure is illustrated by taking an application scenario of access control as an example.

Figure 1:
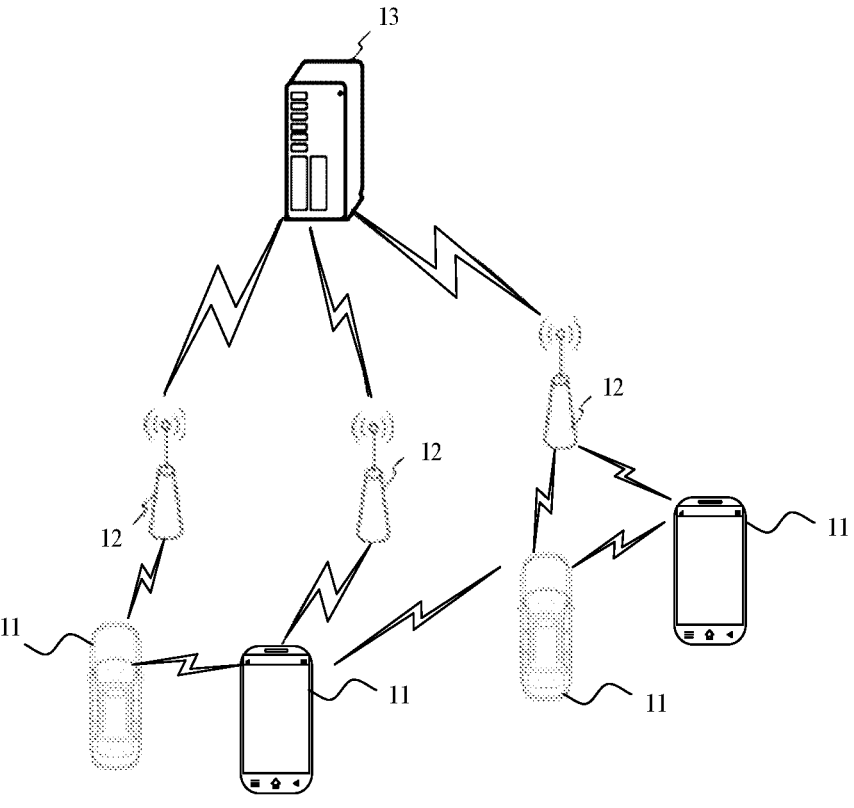
FIG. 1 is a schematic structural diagram illustrating a wireless communication system according to an exemplary embodiment.

Reference is made to FIG. 1, which illustrates a schematic structural diagram of a wireless communication system according to an embodiment of the present disclosure. As shown in FIG. 1, the wireless communication system is a communication system based on cellular mobile communication technology, and the wireless communication system may include a plurality of terminal devices 11 and a plurality of base stations 12.

The terminal device 11 may provide voice and/or data connectivity to a user. The terminal device 11 may communicate with one or more core networks via a Radio Access Network (RAN). The terminal device 11 may be an IoT terminal such as a sensor device and a mobile phone (also called "cellular" phone), and a computer with an IoT terminal, which may be, for example, a fixed, portable, pocket-sized, handheld, computer built-in, or vehicle-mounted device, such as a station (STA), a subscriber unit, a subscriber station, a mobile station, a mobile, a remote station, an access point, a remote terminal, an access terminal, a user terminal, a user agent, a user device, or user equipment. Alternatively, the terminal device 11 may be an unmanned aerial vehicle (UAV) device. Alternatively, the terminal device 11 may be an in-vehicle device, such as, for example, a trip computer with a wireless communication capability, or a wireless terminal with an external trip computer. Alternatively, the terminal device 11 may be a roadside infrastructure, such as, for example, a street light, a signal light, or other roadside infrastructure with a wireless communication capability.

The base station 12 may be a network side device in the wireless communication system. The wireless communication system may be a 4th generation mobile communication (4G) system, also known as a Long Term Evolution (LTE) system. Alternatively, the wireless communication system may be a 5G system, also known as a New Radio (NR) system or 5G NR system. Alternatively, the wireless communication system may be a next-generation system to the 5G system. An access network in the 5G system may be called an NG-RAN (New Generation-Radio Access Network).

The base station 12 may be an evolved Node B (eNB) as adopted in a 4G system. Alternatively, the base station 12 may be a base station (gNB) in a 5G system with a centralized and distributed architecture. When the base station 12 adopts the centralized and distributed architecture, a central unit (CU) and at least two distributed units (DUs) are usually included. A protocol stack of a Packet Data Convergence Protocol (PDCP) layer, a Radio Link Control (RLC) layer, and a Media Access Control (MAC) layer is provided in the central unit, and a protocol stack of a Physical (PHY) layer is provided in the distributed unit. The specific implementation of the base station 12 is not limited in the embodiments of the present disclosure.

A wireless connection may be established between the base station 12 and the terminal device 11 via an air interface. In various implementations, the air interface is an air interface based on a 4G standard. Alternatively, the air interface is an air interface based on a 5G standard, for example, the air interface is New Radio. Alternatively, the air interface may be an air interface based on the next generation mobile communication network technology standard to 5G.

In some embodiments, an E2E (End to End) connection may be established between the terminal devices 11 in vehicle-to-everything (V2X) communication scenarios, such as V2V (vehicle-to-vehicle) communication, V2I (vehicle-to-infrastructure) communication, and V2P (vehicle-to-pedestrian) communication.

In some embodiments, the above wireless communication system may further include a network management device 13.

The plurality of base stations 12 are connected to the network management device 13. The network management device 13 may be a core network device in the wireless communication system. For example, the network management device 13 may be a Mobility Management Entity (MME) in an Evolved Packet Core (EPC) network. Alternatively, the network management device may be another core network device such as a Serving GateWay (SGW), a Public Data Network GateWay (PGW), a Policy and Charging Rules Function (PCRF) unit, or a Home Subscriber Server (HSS). The form in which the network management device 13 is implemented is not limited in the embodiments of the present disclosure.

Figure 2:
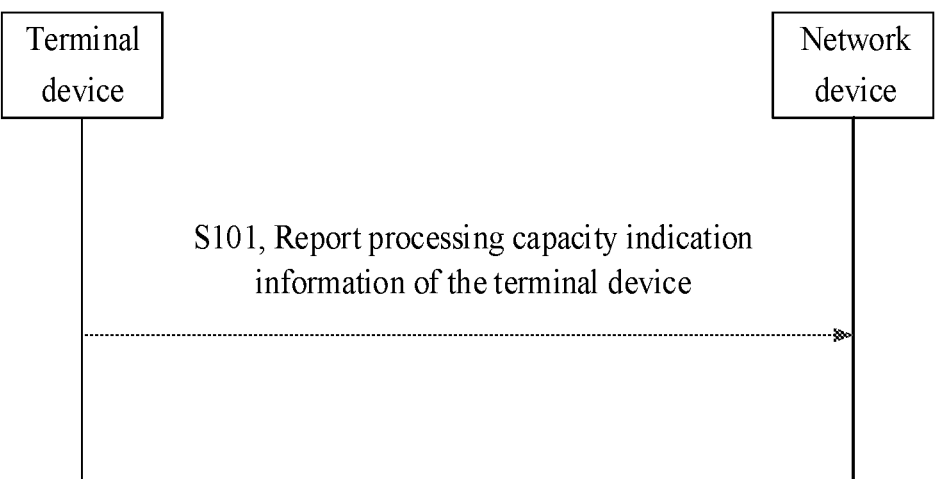
FIG. 2 is a schematic flowchart illustrating a method of reducing interference according to a first exemplary embodiment.

As shown in FIG. 2, embodiments of the present disclosure provide a method of reducing interference, performed by a terminal device. The method includes step S101.

At step S101, reporting processing capacity indication information of the terminal device is performed. Where the processing capacity indication information is configured to indicate a processing capacity of the terminal device in a carrier aggregation scenario.

Herein, the terminal device may be any electronic device with a wireless communication capability including UE, for example, a mobile phone, a tablet computer, an IoT device, a vehicle-mounted communication device, or the like.

Different types of terminal devices may have different processing capacities for uplink or downlink signals. For example, if the terminal device supports IBM for independent received/transmit beams, it may receive downlink data from different serving cells through independent received/transmit beams, which is thus less prone to inter-symbol interference. In contrast, if the terminal device supports only CBM, inter-symbol interference may occur during the scheduling of downlink services by the network device.

For a carrier aggregation scenario, especially an inter-band high-frequency carrier aggregation scenario, terminal devices have different processing capacities for data transmission and reception in different serving cells by using beams. For example, for terminal devices with higher processing capacities, the use of independent received or transmit beams for different serving cells is supported. For terminal devices with lower processing capacity, only common beams may be used across different serving cells. As a result, services for different serving cells may be more prone to inter-symbol interference.

To this end, the terminal device may report its own processing capacity, e.g., whether the terminal device supports the above-mentioned IBM, or a Maximum Received Timing Difference (MRTD) or a Maximum Transmit Timing Difference (MTTD) supported by the terminal device, etc. The network device may then determine, based on the capacity of the terminal device, whether a restriction on scheduling of services of the terminal device is required, for example, by suspending scheduling of downlink services of the terminal device.

Herein, the processing capacity indication information may be configured to indicate a time period when the terminal device is prone to inter-symbol interference, and the corresponding scheduling restriction by the network device may be to stop scheduling of downlink services for the terminal device during the time period indicated by the processing capacity indication information. The processing capacity indication information may also be configured to indicate a situation where the terminal device is prone to inter-symbol interference, for example, in the situation of beam switching, etc., a scheduling restriction is required. The corresponding scheduling restriction by the network device may then be to stop scheduling of downlink services when the terminal device is in the process of beam switching.

In this way, the terminal device may report to the network device the processing capacity indication information corresponding to its own capacity, such that the network device restricts scheduling of services when determining that inter-symbol interference or the like may occur at the terminal device, thereby reducing interference due to unsupported capacity of the terminal device during scheduling of services.

In some embodiments, the processing capacity indication information includes at least one of the MRTD or the MTTD supported by the terminal device.

In the embodiments of the present disclosure, for terminal devices that support CBM, since they can only use common received/transmit beams for data reception and transmission in different serving cells, if a received timing difference or transmit timing difference between the serving cells is too large, inter-symbol interference may occur. To this end, the terminal device may report the MRTD and the MTTD it supports, and the network device may determine, based on the maximum timing difference supported by the terminal device as reported by the terminal device, whether inter-symbol interference may occur during scheduling of services, and then determine whether or not to perform the scheduling of services.

In some embodiments, the processing capacity indication information includes at least one of: first indication information indicating whether the MRTD supported by the terminal device is less than a duration of a Cyclic Prefix (CP); or second indication information indicating whether the MTTD supported by the terminal device is less than the duration of the CP.

Herein, CP is an extension of a symbol formed by copying a signal at the end of an OFDM (Orthogonal Frequency Division Multiplexing) symbol to its beginning, which can play a role in reducing inter-symbol interference (ISI) as well as inter-channel interference (ICI).

If the MRTD or MTTD supported by the terminal device is greater than the duration of the CP, it is prone to cause inter-symbol interference when the terminal device receives signals from different serving cells through the same received beam or transmits signals to different cells in a carrier aggregation scenario. To this end, the processing capacity indication information may be configured to indicate the relationship between the MRTD and MTTD supported by the terminal device and the CP. Thus, the network device may determine, based on the processing capacity indication information reported by the terminal device, whether the duration of the CP of its OFDM is greater than the MRTD and MTTD supported by the terminal device, so as to determine whether a scheduling restriction is required.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In the embodiments of the present disclosure, the processing capacity indication information may include indication information as to whether the MRTD for the terminal device is less than the duration of the CP and whether the MTTD for the terminal device is less than the duration of the CP.

If the MRTD is less than the duration of the CP and the MTTD is less than the duration of the CP, the terminal device is less prone to inter-symbol interference during beam switching. Thus, no scheduling restriction is required. In other cases, the terminal device is more prone to inter-symbol interference during beam switching, and thus a scheduling restriction may be required.

Therefore, in the embodiments of the present disclosure, the terminal device may report the above-mentioned third indication information or fourth indication information to inform the network device whether a scheduling restriction is required. If the terminal device reports the third indication information, the network device may determine that no scheduling restriction is required. In other words, the network device may continue to schedule services when the terminal device is performing beam switching or the like. If the terminal device reports the fourth indication information, the network device may perform a scheduling restriction, i.e., suspend the scheduling of downlink services, when the terminal device is performing beam switching.

In some embodiments, the processing capacity indication information indicates that the MRTD supported by the terminal device is not less than the duration of the CP, and/or indicates that the MTTD supported by the terminal device is not less than the duration of the CP, then a scheduling restriction on the terminal device by the network device is required.

The processing capacity indication information indicates that the MRTD supported by the terminal device is less than the duration of the CP, and that the MTTD supported by the terminal device is less than the duration of the CP, then no scheduling restriction on the terminal device by the network device is required.

In the embodiments of the present disclosure, regardless of how the terminal device reports the processing capacity indication information, the processing capacity indication information of the terminal device may be configured to determine the relationship between the MRTD and MTTD supported by the terminal device and the CP, thereby facilitating the network device to determine whether a scheduling restriction on the terminal device is required. In this way, the possibility of inter-symbol interference can be minimized for terminal devices with different capacities.

Figure 3:
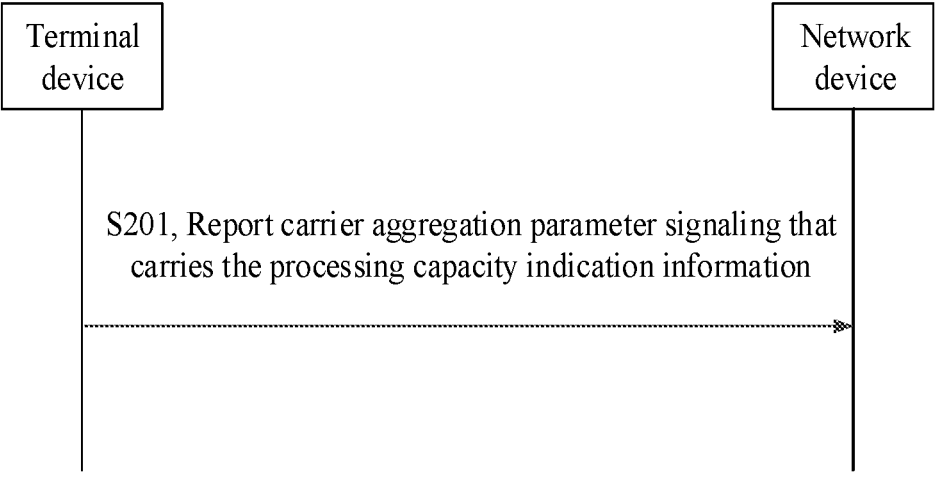
FIG. 3 is a schematic flowchart illustrating a method of reducing interference according to a second exemplary embodiment.

As shown in FIG. 3, embodiments of the present disclosure provide a method of reducing interference, performed by a terminal device. The method includes step S201.

At step S201, reporting carrier aggregation parameter signaling that carries the processing capacity indication information is performed.

In the embodiments of the present disclosure, the terminal device may carry the processing capacity indication information in carrier aggregation parameter signaling (IE CA-ParametersNR), and report to the network device the processing capacity of the terminal device in the high-frequency carrier aggregation scenario, thereby facilitating the network device to determine, based on the signaling, whether a scheduling restriction on the terminal device is required.

In an embodiment, the terminal device may carry the processing capacity indication information as a field in the above-mentioned carrier aggregation parameter signaling, and the network device determines whether a scheduling restriction on the terminal device is required from information obtained by decoding the field. For example, a byte is used to indicate a value of the MRTD supported by the terminal device, and another byte is used to indicate a value of the MTTD supported by the terminal device. In addition, the terminal device may indicate its own capacity by a character bit; for example, a scheduling restriction is required when the character bit takes the value of "1", and no scheduling restriction is required when the character bit takes the value of "0".

In another embodiment, the terminal device may carry the processing capacity indication information, which indicates whether or not a scheduling restriction by the network device is required, as implicit information in the above-mentioned carrier aggregation parameter signaling. For example, whether or not a scheduling restriction is required is indicated separately by different circumstances, such as the coding method of the signaling, and the number of scrambling.

In practical application, how the terminal device reports its own processing capacity indication information can be set as required, and is not limited herein.

Figure 4:
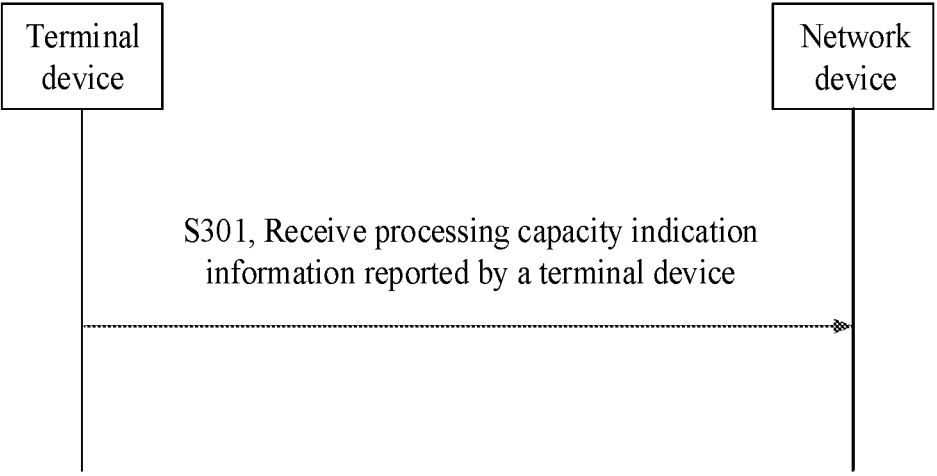
FIG. 4 is a schematic flowchart illustrating a method of reducing interference according to a third exemplary embodiment.

As shown in FIG. 4, embodiments of the present disclosure provide a method of reducing interference, performed by a network device. The method includes step S301.

At step S301, receiving processing capacity indication information reported by a terminal device is performed. Where the processing capacity indication information is configured to indicate a processing capacity of the terminal device in a carrier aggregation scenario.

Different types of terminal devices may have different processing capacities for uplink or downlink signals. For example, if the terminal device supports IBM for independent received/transmit beams, the terminal device may receive downlink data from different serving cells through independent received/transmit beams, which is thus less prone to inter-symbol interference. In contrast, if the terminal device supports only CBM, inter-symbol interference may occur during the scheduling of downlink services by the network device. To this end, the network device may determine, from the processing capacity indication information reported by the terminal device, whether a scheduling restriction on the terminal device is required during scheduling of downlink services for the terminal device.

Herein, the network device may be a device such as a base station or a core network, which is configured to schedule downlink services for the terminal device.

The processing capacity indication information may be configured to indicate a time period when the terminal device is prone to inter-symbol interference. Further, the corresponding scheduling restriction may be to stop scheduling of downlink services for the terminal device during the time period indicated by the processing capacity indication information. The processing capacity indication information may also be configured to indicate a situation where the terminal device is prone to inter-symbol interference, for example, in the situation of beam switching, etc., a scheduling restriction is required. The corresponding scheduling restriction may then be to stop scheduling of downlink services when the terminal device is in the process of beam switching.

In this way, the network device may restrict scheduling of services when determining that inter-symbol interference or the like may occur at the terminal device, thereby reducing interference due to the unsupported capacity of the terminal device during scheduling of services.

In some embodiments, the processing capacity indication information includes at least one of the MRTD or the MTTD supported by the terminal device.

In the embodiments of the present disclosure, for terminal devices that support CBM, since they can only use common received/transmit beams for data reception and transmission in different serving cells, if a received timing difference or transmit timing difference between the serving cells is too large, then inter-symbol interference may occur. To this end, the processing capacity indication information reported by the terminal device may include the MRTD and the MTTD supported by the terminal device. Further, the network device may determine, based on the maximum timing difference supported by the terminal device as reported by the terminal device, whether inter-symbol interference may occur during scheduling of services, and then determine whether or not to perform the scheduling of services.

In some embodiments, the processing capacity indication information includes at least one of: first indication information indicating whether the MRTD supported by the terminal device is less than a duration of a Cyclic Prefix (CP); or second indication information indicating whether the MTTD supported by the terminal device is less than the duration of the CP.

Herein, CP is an extension of a symbol formed by copying a signal at the end of an OFDM symbol to its beginning, which can play a role in reducing inter-symbol interference (ISI) as well as inter-channel interference (ICI).

If the MRTD or MTTD supported by the terminal device is greater than the duration of the CP, it is prone to cause inter-symbol interference when the terminal device receives signals from different serving cells through the same received beam or transmits signals to different cells in a carrier aggregation scenario. To this end, the processing capacity indication information may be configured to indicate the relationship between the MRTD and MTTD supported by the terminal device and the CP. The network device may determine, based on the processing capacity indication information reported by the terminal device, whether the duration of the CP of its OFDM is greater than the MRTD and MTTD supported by the terminal device, so as to determine whether a scheduling restriction is required.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In the embodiments of the present disclosure, the processing capacity indication information may include indication information as to whether the MRTD for the terminal device is less than the duration of the CP and whether the MTTD for the terminal device is less than the duration of the CP.

If the MRTD is less than the duration of the CP and the MTTD is less than the duration of the CP, the terminal device is less prone to inter-symbol interference during beam switching, and thus no scheduling restriction may be required. In other cases, the terminal device is more prone to inter-symbol interference during beam switching, and thus a scheduling restriction may be required.

Therefore, in the embodiments of the present disclosure, the terminal device may report the above-mentioned third indication information or fourth indication information to inform the network device whether a scheduling restriction is required. If the terminal device reports the third indication information, the network device may determine that no scheduling restriction is required, such that the network device may continue to schedule services when the terminal device is performing beam switching or the like. If the terminal device reports the fourth indication information, the network device may perform a scheduling restriction, i.e., suspend the scheduling of downlink services, when the terminal device is performing beam switching.

As shown in FIG. 5, embodiments of the present disclosure provide a method of reducing interference, performed by a network device. The method includes previously described step S301 and further includes step S401 or S402.

At step S401, in response to the processing capacity indication information of the terminal device indicating that the MRTD supported by the terminal device is not less than the duration of the CP, and/or that the MTTD supported by the terminal device is not less than the duration of the CP, determine that a scheduling restriction on the terminal device is required. At step S402, in response to the processing capacity indication information of the terminal device indicating that the MRTD supported by the terminal device is less than the duration of the CP, and that the MTTD supported by the terminal device is less than the duration of the CP, determining that no scheduling restriction on the terminal device is required.

In the embodiments of the present disclosure, regardless of how the terminal device reports the processing capacity indication information, the processing capacity indication information of the terminal device may be configured to determine the relationship between the MRTD and MTTD supported by the terminal device and the CP.

Thus, the network device may determine, based on the processing capacity indication information, whether the MRTD supported by the terminal device is less than the duration of the CP and whether the MTTD is less than the duration of the CP, so as to determine whether a scheduling restriction is required.

If the MRTD and the MTTD supported by the terminal device are both less than the duration of the CP, the network device may determine that no scheduling restriction is required. If the MRTD reported by the terminal device is not less than the duration of the CP, the network device needs to perform a scheduling restriction when scheduling downlink services for the terminal device; and if the MTTD reported by the terminal device is not less than the duration of the CP, the network device needs to perform a scheduling restriction when scheduling uplink services for the terminal device.

In this way, the network device may separately determine, based on the processing capacity indication information reported by different terminal devices, whether scheduling restrictions are required, thereby reducing problems such as inter-symbol interference generated during data transmission and reception at the terminal devices.

As shown in FIG. 6, embodiments of the present disclosure provide a method of reducing interference, performed by a network device. The method includes step S501.

At step S501, receiving carrier aggregation parameter signaling that carries the processing capacity indication information is performed.

In the embodiments of the present disclosure, the terminal device may carry the processing capacity indication information in carrier aggregation parameter signaling (IE CA-ParametersNR). Thus, the network device may determine, from the carrier aggregation parameter signaling reported by the terminal device, the processing capacity of the terminal device in the high-frequency carrier aggregation scenario, and then determine, based on the signaling, whether a scheduling restriction on the terminal device is required.

The embodiments of the present disclosure further provide the following examples.

In high-frequency carrier aggregation scenarios, for UE supporting IBM, independent received or transmitted beams may be used for data reception and transmission in different serving cells, respectively. For UE supporting only CBM, only common received/transmitted beams may be used for reception/transmission in different serving cells. Therefore, if the received/transmitted timing difference between the serving cells is greater than the duration of the CP, inter-symbol interference may occur when the network device performs scheduling of downlink services. Moreover, if the UE is in the process of performing received/transmit beam switching, it is impossible for the UE to perform reception of downlink services or transmission of uplink services in the serving cells.

Thus, in the embodiments of the present disclosure, the UE indicates to the network device its maximum received timing difference, i.e., the above-mentioned MRTD, and its maximum transmit timing difference, i.e., the above-mentioned MTTD, in the high-frequency carrier aggregation scenario, such that whether or not scheduling of services may be performed during received or transmit beam switching at the UE can be effectively solved.

In the embodiments of the present disclosure, the processing capacity indication information corresponding to the MRTD and the MTTD supported by the terminal device may be introduced in the IE CA-ParametersNR signaling. For example, the terminal device may report its own processing capacity as "type 1" or "type 2". The type 1 indicates that the MRTD and the MTTD, indicating the processing capacity of the terminal device have values of R1 and T1, respectively, where the values of both R1 and T1 are less than a length (duration) of the CP. The type 2 indicates that the MRTD and the MTTD, indicating the processing capacity of the terminal device have values of R2 and T2, respectively, where the values of both R2 and T2 are not less than the length of the CP.

The terminal device may report the IE CA-ParametersNR signaling that carries an indication that its own processing capacity is of "type 1" or "type 2", thus informing the network device of its own processing capacity.

If the capacity reported by the terminal device is of "type 1", the network device may schedule data services during the received or transmitted beam switching at the terminal device. In contrast, if the capacity reported by the terminal device is of "type 2", the network device may not schedule uplink or downlink services on the corresponding n OFDM symbols during a period in which the received or transmitted beam switching is performed at the terminal device. In this way, the terminal device, by indicating to the network device its own capacity to support the MRTD and MTTD in the high-frequency carrier aggregation scenario, facilitates the network device in determining whether a scheduling restriction is required during beam switching at the terminal device, thereby reducing problems such as abnormal scheduling or inter-symbol interference during beam switching due to the limited capacity of the terminal device.

Figures 7, 8:
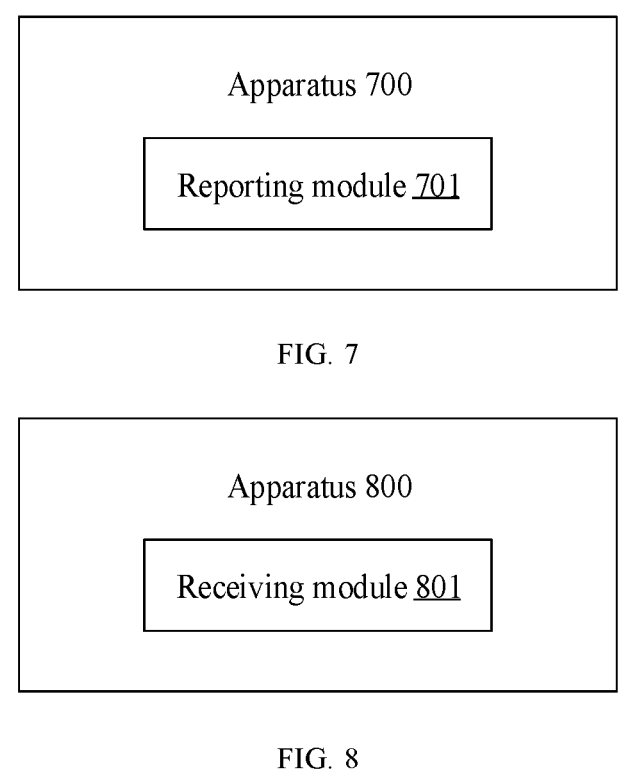

As shown in FIG. 7, embodiments of the present disclosure further provide an apparatus 700 for reducing interference, applied to a terminal device. The apparatus 700 includes a reporting module 701.

The reporting module 701 is configured to report processing capacity indication information of the terminal device, where the processing capacity indication information is configured to indicate a processing capacity of the terminal device in a carrier aggregation scenario.

In some embodiments, the processing capacity indication information includes at least one of a Maximum Received Timing Difference MRTD or a Maximum Transmit Timing Difference MTTD supported by the terminal device.

In some embodiments, the processing capacity indication information includes at least one of: first indication information indicating whether the MRTD supported by the terminal device is less than a duration of a Cyclic Prefix CP; or second indication information indicating whether the MTTD supported by the terminal device is less than the duration of the CP.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In some embodiments, the processing capacity indication information indicates that the MRTD supported by the terminal device is not less than the duration of the CP, and/or indicates that the MTTD supported by the terminal device is not less than the duration of the CP, then a scheduling restriction on the terminal device by a network device is required. The processing capacity indication information indicates that the MRTD supported by the terminal device is less than the duration of the CP, and that the MTTD supported by the terminal device is less than the duration of the CP, then no scheduling restriction on the terminal device by the network device is required.

In some embodiments, the reporting module includes: a reporting sub-module configured to report carrier aggregation parameter signaling that carries the processing capacity indication information.

As shown in FIG. 8, embodiments of the present disclosure further provide an apparatus 800 for reducing interference, applied to a network device. The apparatus 800 includes a receiving module 801.

The receiving module 801 is configured to receive processing capacity indication information reported by a terminal device, where the processing capacity indication information is configured to indicate a processing capacity of the terminal device in a carrier aggregation scenario.

In some embodiments, the processing capacity indication information includes at least one of an MRTD or an MTTD supported by the terminal device.

In some embodiments, the processing capacity indication information includes at least one of: first indication information indicating whether the MRTD supported by the terminal device is less than a duration of a Cyclic Prefix CP; or second indication information indicating whether the MTTD supported by the terminal device is less than the duration of the CP.

In some embodiments, the processing capacity indication information includes: third indication information indicating that the MRTD supported by the terminal device is less than the duration of the CP, and that the MTTD supported by the terminal device is less than the duration of the CP; or fourth indication information indicating that the MRTD supported by the terminal device is not less than the duration of the CP, or that the MTTD supported by the terminal device is not less than the duration of the CP.

In some embodiments, the apparatus 800 further includes a first determining module or a second determining module.

The first determining module is configured to, in response to the processing capacity indication information of the terminal device indicating that the MRTD supported by the terminal device is not less than the duration of the CP, and/or that the MTTD supported by the terminal device is not less than the duration of the CP, determine that a scheduling restriction on the terminal device is required.

The second determining module is configured to, in response to the processing capacity indication information of the terminal device indicating that the MRTD supported by the terminal device is less than the duration of the CP, and that the MTTD supported by the terminal device is less than the duration of the CP, determine that no scheduling restriction on the terminal device is required.

In some embodiments, the receiving module 801 includes a receiving sub-module configured to receive carrier aggregation parameter signaling that carries the processing capacity indication information.

With respect to the apparatuses in the above embodiments, the specific manner in which each module performs an operation has been described in detail in the relevant method embodiments, and will not be described in detail herein.

Figure 9:
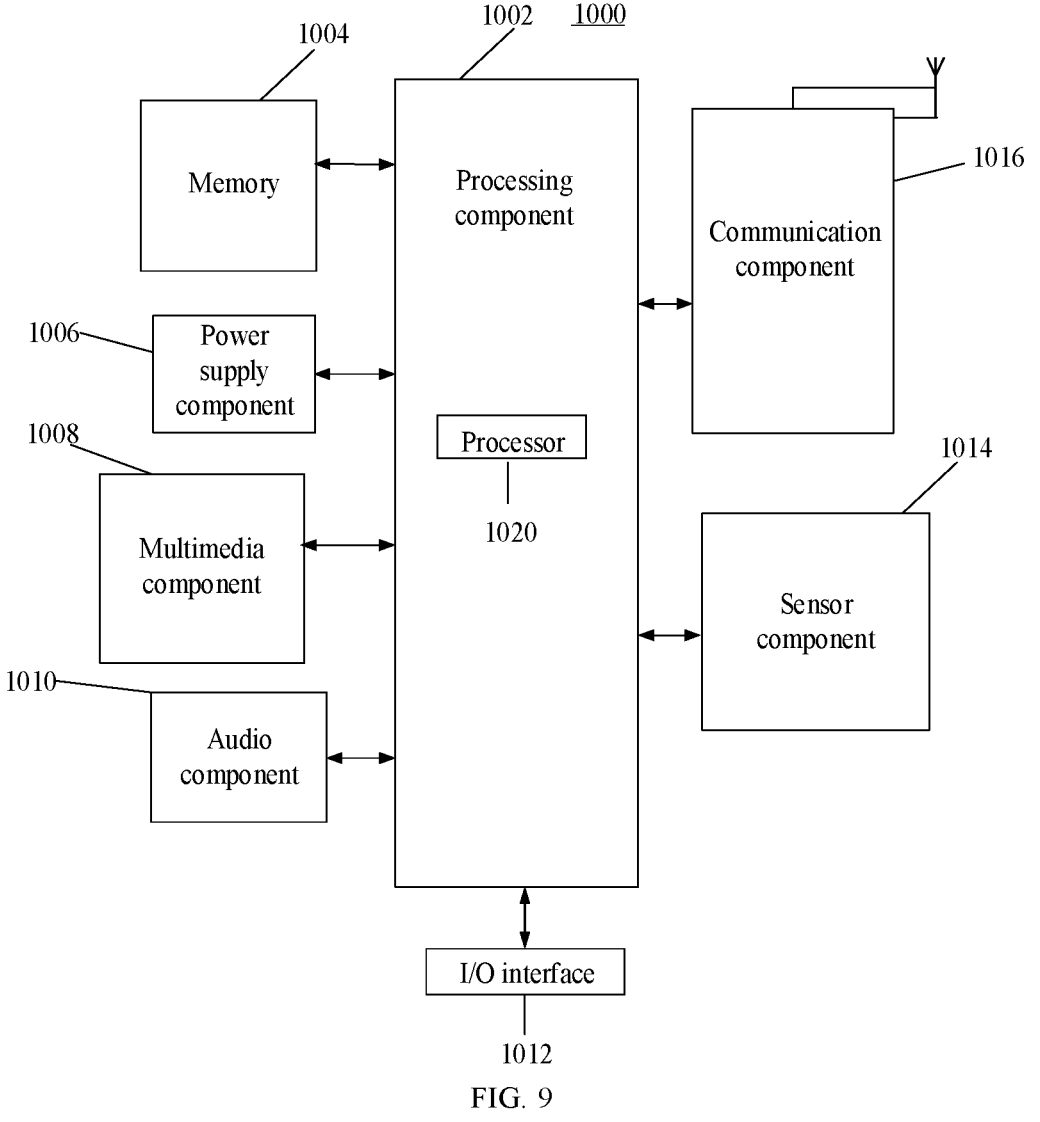
FIG. 9 is a schematic structural diagram illustrating a communication device according to a first exemplary embodiment.

FIG. 9 is a block diagram illustrating a structure of a communication device 1000 according to an embodiment of the present disclosure. The communication device 1000 may be a terminal device. For example, the communication device 1000 may be a mobile phone, a computer, a digital broadcast user equipment, a message transceiver device, a gaming console, a tablet device, a medical device, a fitness device, a personal digital assistant, and the like.

Referring to FIG. 9, the communication device 1000 may include at least one of a processing component 1002, a memory 1004, a power supply component 1006, a multimedia component 1008, an audio component 1010, an input/output (I/O) interface 1012, a sensor component 1014, or a communication component 1016.

The processing component 1002 generally controls overall operations of the communication device 1000, such as operations associated with display, a telephone call, data communication, a camera operation, and a record operation. The processing component 1002 may include at least one processor 1020 for executing instructions to implement all or part of the steps in the above methods or for performing the functions of the modules in the recited apparatuses. Further, the processing component 1002 may include at least one module to facilitate interaction between the processing component 1002 and another component. For example, the processing component 1002 may include a multimedia module to facilitate interaction between the multimedia component 1008 and the processing component 1002.

The memory 1004 is configured to store various types of data to support operations at the communication device 1000. Examples of such data include instructions for any application or method operated on the communication device 1000, contact data, phonebook data, messages, pictures, videos, and so on. The memory 1004 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 1006 supplies power to various components of the communication device 1000. The power supply component 1006 may include a power management system, at least one power supply, and other components associated with generating, managing and distributing power for the communication device 1000.

The multimedia component 1008 includes a screen for providing an output interface between the communication device 1000 and a user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, swipes and gestures on the touch panel.

The touch sensor may not only sense a boundary of a touch or swipe action, but also detect wake-up time and pressure associated with the touch or swipe action. In some embodiments, the multimedia component 1008 includes a front camera and/or a rear camera. When the communication device 1000 is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 1010 is configured to output and/or input an audio signal. For example, the audio component 1010 includes a microphone (MIC) configured to receive an external audio signal when the communication device 1000 is in an operation mode, such as a call mode, a record mode, and a voice recognition mode. The received audio signal may be further stored in the memory 1004 or transmitted via the communication component 1016. In some embodiments, the audio component 1010 further includes a speaker for outputting an audio signal.

The I/O interface 1012 provides an interface between the processing component 1002 and a peripheral interface module. The peripheral interface module may be a keyboard, a click wheel, a button, or the like. The button may include but is not limited to, a home button, a volume button, a start button, and a lock button.

The sensor component 1014 includes at least one sensor for providing a state assessment in various aspects for the communication device 1000. For example, the sensor component 1014 may detect an on/off state of the device 1000, and relative positioning between components, which are, for example, a display and a keypad of the communication device 1000. The sensor component 1014 may also detect a change in position of the communication device 1000 or a component of the communication device 1000, the presence or absence of a touch of a user on the communication device 1000, an orientation or acceleration/deceleration of the communication device 1000, and a change in temperature of the communication device 1000. The sensor component 1014 may include a proximity sensor configured to detect the presence of a nearby object without any physical contact. The sensor component 1014 may further include an optical sensor, such as a CMOS or CCD image sensor, for use in an imaging application. In some embodiments, the sensor component 1014 may further include an acceleration sensor, a gyro sensor, a magnetic sensor, a pressure sensor, or a temperature sensor.

The communication component 1016 is configured to facilitate wired or wireless communication between the communication device 1000 and other devices. The communication device 1000 may access a wireless network based on a communication standard, such as WiFi, 2G, 3G, 4G, 5G, 6G, or a combination thereof. In an exemplary embodiment, the communication component 1016 receives a broadcast signal or broadcast-related information from an external broadcast management system via a broadcast channel. In an exemplary embodiment, the communication component 1016 further includes a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the communication device 1000 may be implemented by at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing the methods described above.

In an exemplary embodiment, there is further provided a non-transitory computer-readable storage medium including instructions, such as the memory 1004 including instructions. The instructions may be executed by the processor 1020 of the communication device 1000 to implement the above methods. For example, the non-transitory computer-readable storage medium may be an ROM, a Random Access Memory (RAM), a CD-ROM, a magnetic tape, a floppy disk, and an optical data storage device, etc.

Figure 10:
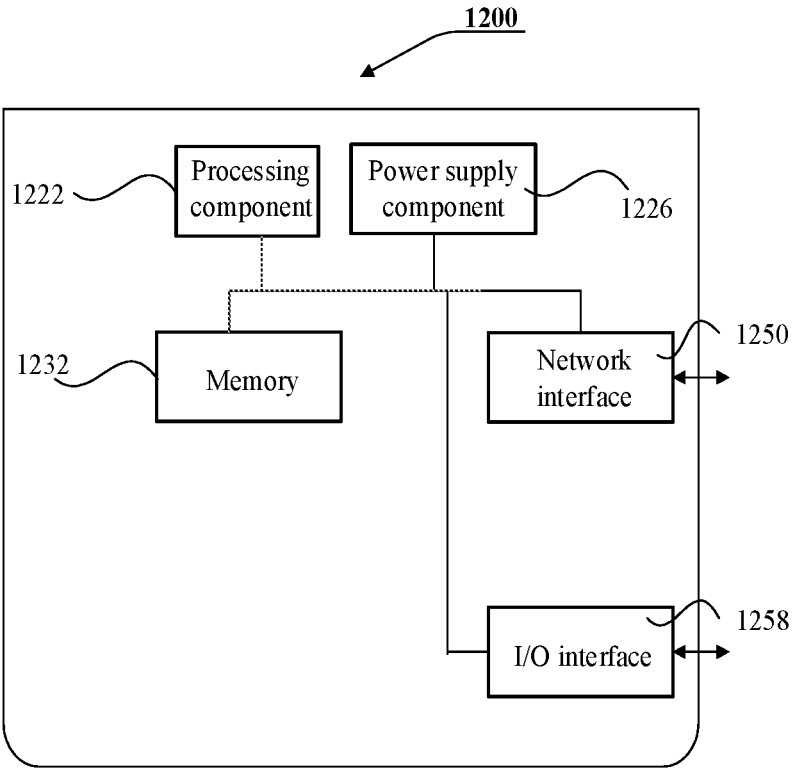
FIG. 10 is a schematic structural diagram illustrating a communication device according to a second exemplary embodiment.

As shown in FIG. 10, an embodiment of the present disclosure illustrates a structure of another communication device. The communication device 1200 may be the base station involved in the embodiments of the present disclosure. For example, the communication device 1200 may be provided as a network device. Referring to FIG. 10, the communication device 1200 includes a processing component 1222 which further includes at least one processor (not shown), and a memory resource represented by a memory 1232 for storing instructions, such as application programs, executable by the processing component 1222. The application program stored in the memory 1232 may include one or more modules each corresponding to a set of instructions. In addition, the processing component 1222 is configured to execute the instructions to perform the methods described above.

The communication device 1200 may further include a power supply component 1226 configured to perform power management of the communication device 1200, a wired or wireless network interface 1250 configured to connect the communication device 1200 to a network, and an input/output (I/O) interface 1258. The communication device 1200 may be operated based on an operating system stored in the memory 1232, for example, Windows Server™, Mac OS X™ Unix™, Linux™, FreeBSD™, or the like.

Other embodiments of the present disclosure will readily occur to those skilled in the art upon consideration of the specification and practice of the invention disclosed herein. The present disclosure is intended to cover any variations, uses, or adaptations of the present disclosure that follow the general principles of the present disclosure and include common general knowledge or conventional technical means in the art not disclosed herein. The specification and embodiments are to be considered exemplary only, with a true scope and spirit of the present disclosure being indicated by the following claims.

It should be understood that the present disclosure is not limited to the precise structures which have been described above and shown in the accompanying drawings, and that various modifications and changes may be made without departing from the scope thereof. The scope of the present disclosure is limited only by the appended claims.

The invention claimed is:

1. A method of reducing interference, performed by a terminal device, the method comprising:
   reporting processing capacity indication information of the terminal device, wherein the processing capacity indication information is configured to indicate a processing capacity of the terminal device in a carrier aggregation scenario; and
   wherein in response to the processing capacity indication information indicating that at least one of a Maximum Received Timing Difference (MRTD) supported by the terminal device is not less than a duration of a Cyclic Prefix (CP), or a Maximum Transmit Timing Difference (MTTD) supported by the terminal device is not less than the duration of the CP, a scheduling restriction on the terminal device by a network device is required.

2. The method according to claim 1, wherein
   the processing capacity indication information indicates that the MRTD supported by the terminal device is less than the duration of the CP, and that the MTTD supported by the terminal device is less than the duration of the CP, then no scheduling restriction on the terminal device by the network device is required.

3. The method according to claim 1, wherein reporting the processing capacity indication information of the terminal device, comprises:
   reporting carrier aggregation parameter signaling that carries the processing capacity indication information.

4. A method of reducing interference, performed by a network device, the method comprising:
   receiving processing capacity indication information reported by a terminal device, wherein the processing capacity indication information is configured to indicate a processing capacity of the terminal device in a carrier aggregation scenario; and
   in response to the processing capacity indication information of the terminal device indicating that at least one of a Maximum Received Timing Difference (MRTD) supported by the terminal device is not less than a duration of a Cyclic Prefix (CP), or a Maximum Transmit Timing Difference (MTTD) supported by the terminal device is not less than the duration of the CP, determining that a scheduling restriction on the terminal device is required.

5. The method according to claim 4, further comprising:
   in response to the processing capacity indication information of the terminal device indicating that the MRTD supported by the terminal device is less than the duration of the CP, and that the MTTD supported by the terminal device is less than the duration of the CP, determining that no scheduling restriction on the terminal device is required.

6. The method according to claim 4, wherein receiving the processing capacity indication information reported by the terminal device, comprises:
   receiving carrier aggregation parameter signaling that carries the processing capacity indication information.

7. A communication device, comprising at least a processor and an interface circuit, wherein
   the interface circuit is configured to receive code instructions and transmit the code instructions to the processor; and
   the processor is configured to run the code instructions to perform operations comprising:
   reporting processing capacity indication information of a terminal device, wherein the processing capacity indication information is configured to indicate a processing capacity of the terminal device in a carrier aggregation scenario; and
   wherein in response to the processing capacity indication information indicating that at least one of a Maximum Received Timing Difference (MRTD) supported by the terminal device is not less than a duration of a Cyclic Prefix (CP), or a Maximum Transmit Timing Difference (MTTD) supported by the terminal device is not less than the duration of the CP, a scheduling restriction on the terminal device by a network device is required.

8. A non-transitory computer-readable storage medium for storing computer-executable instructions, wherein the computer-executable instructions, when executed, are configured to perform the method according to claim 1.

9. The communication device according to claim 7, wherein the processing capacity indication information indicates that the MRTD supported by the terminal device is less than the duration of the CP, and that the MTTD supported by the terminal device is less than the duration of the CP, then no scheduling restriction on the terminal device by the network device is required.

10. A communication device, comprising at least a processor and an interface circuit, wherein the interface circuit is configured to receive code instructions and transmit the code instructions to the processor; and the processor is configured to run the code instructions to perform the method according to claim 4.

11. A non-transitory computer-readable storage medium storing computer-executable instructions, wherein the computer-executable instructions, when executed, are configured to perform the method according to claim 4.

12. The non-transitory computer-readable storage medium according to claim 11, wherein the operations further comprise:

in response to the processing capacity indication information of the terminal device indicating that the MRTD supported by the terminal device is less than the duration of the CP, and that the MTTD supported by the terminal device is less than the duration of the CP, determining that no scheduling restriction on the terminal device is required.

13. The non-transitory computer-readable storage medium according to claim 11, wherein receiving the processing capacity indication information reported by the terminal device, comprises:

receiving carrier aggregation parameter signaling that carries the processing capacity indication information.

14. The communication device according to claim 7, wherein reporting the processing capacity indication information of the terminal device, comprises:

reporting carrier aggregation parameter signaling that carries the processing capacity indication information.

15. The non-transitory computer-readable storage medium according to claim 8, wherein in response to the processing capacity indication information indicating that the MRTD supported by the terminal device is less than the duration of the CP, and that the MTTD supported by the terminal device is less than the duration of the CP, no scheduling restriction on the terminal device by the network device is required.

16. The non-transitory computer-readable storage medium according to claim 8, wherein reporting the processing capacity indication information of the terminal device, comprises:

reporting carrier aggregation parameter signaling that carries the processing capacity indication information.

17. The communication device according to claim 10, wherein the operations further comprise:

in response to the processing capacity indication information of the terminal device indicating that the MRTD supported by the terminal device is less than the duration of the CP, and that the MTTD supported by the terminal device is less than the duration of the CP, determining that no scheduling restriction on the terminal device is required.

18. The communication device according to claim 10, wherein receiving the processing capacity indication information reported by the terminal device, comprises:

receiving carrier aggregation parameter signaling that carries the processing capacity indication information.

* * * * *